United States Patent [19]
Belt et al.

[11] Patent Number: 5,569,052
[45] Date of Patent: Oct. 29, 1996

[54] COMPUTER FOR USE WITH A PORT REPLICATOR

[75] Inventors: Steven Belt, St. Joseph, Mich.; Jeffrey Schindler, Lindenhurst, Ill.; Norman Stobert, St. Joseph, Mich.

[73] Assignee: Zenith Data Systems Corporation, Sacramento, Calif.

[21] Appl. No.: 505,042

[22] Filed: Jul. 21, 1995

Related U.S. Application Data

[62] Division of Ser. No. 104,950, Aug. 10, 1993, Pat. No. 5,460,547, which is a continuation of Ser. No. 862,859, Apr. 3, 1992, abandoned.

[51] Int. Cl.⁶ .................................................. H01R 27/00
[52] U.S. Cl. .................................................... 439/638
[58] Field of Search ........................... 439/638, 650–654, 439/133; 364/708

[56] References Cited

U.S. PATENT DOCUMENTS

| | | | |
|---|---|---|---|
| 3,581,268 | 5/1971 | Akst | 439/507 |
| 4,362,905 | 12/1982 | Ismail | 439/638 |
| 4,788,658 | 11/1988 | Hanebuth | 364/900 |
| 4,975,550 | 12/1990 | Panchisin | 439/133 |
| 5,030,128 | 7/1991 | Herron et al. | 439/939 |
| 5,123,092 | 6/1992 | Buxton et al. | 395/250 |

*Primary Examiner*—Neil Abrams
*Attorney, Agent, or Firm*—Scott B. Dunbar; James A. Sprowl

[57] ABSTRACT

A port replicator is disclosed that provides for the efficient connecting and disconnecting of peripheral devices to a computer. A replicator port connector is provided on a portable computer that duplicates the pins of a other peripheral connectors on the computers. The housing of the port replicator is attached by spring clips to the computer which covers the other peripheral connectors replicated by the port replicator. The replicated connectors are then reproduced on the connector housing. Cables for peripheral devices can remain connected to the connector housing but be connected to and disconnected from the computer in a single action.

18 Claims, 11 Drawing Sheets

| *Fig. 3a* | *Fig. 3b* | *Fig. 3c* |
| --- | --- | --- |
| *Fig. 3d* | *Fig. 3e* | *Fig. 3f* |

| PIN | SIGNAL | KEYBOARD DIRECTION | DEFINITION |
|---|---|---|---|
| 1 | KBDATA | B | KEYBOARD PORT DATA |
| 2 | KBSENSE | I | KEYBOARD PORT SENSE INPUT |
| 3 | EKBDATA | B | MOUSE PORT DATA |
| 4 | EKBCLK | B | MOUSE PORT CLOCK |
| 5 | SYSVCC | - | +5VDC (100 MA MAX) |
| 6 | -SLCTIN | O | PARALLEL PORT PRINTER SELECT COMMAND |
| 7 | -INIT | O | PARALLEL PORT PRINTER RESET |
| 8 | -AUTOFD | O | PARALLEL PORT PRINTER AUTO LINEFEED |
| 9 | -STROBE | O | PARALLEL PORT DATA STROBE |
| 10 | BUSY | I | PARALLEL PORT PRINTER BUSY |
| 11 | -PACK | I | PARALLEL PORT RECIEVE ACKNOWLEDGE FROM PRINTER |
| 12 | PE | I | PARALLEL PORT PRINTER PAPER EMPTY |
| 13 | SLCT | I | PARALLEL PORT PRINTER SELECT KNOWLEDGE |
| 14 | -ERROR | I | PARALLEL PORT ERROR |
| 15 | -ZPORTOK | I | ZPORT CONNECT STATUS SENSE |
| 16 | GND | - | GROUND |
| 17 | PD0 | B | PARALLEL PORT DATA BIT 0 |
| 18 | PD1 | B | PARALLEL PORT DATA BIT 1 |
| 19 | PD2 | B | PARALLEL PORT DATA BIT 2 |
| 20 | PD3 | B | PARALLEL PORT DATA BIT 3 |
| 21 | PD4 | B | PARALLEL PORT DATA BIT 4 |
| 22 | PD5 | B | PARALLEL PORT DATA BIT 5 |
| 23 | PD6 | B | PARALLEL PORT DATA BIT 6 |
| 24 | PD7 | B | PARALLEL PORT DATA BIT 7 |
| 25 | RTS | I | SERIAL PORT REQUEST TO SEND |
| 26 | -TXD | O | SERIAL PORT TRANSMIT DATA |
| 27 | DTR | O | SERIAL PORT DATA TERMINAL READY |
| 28 | -RXD | I | SERIAL PORT RECEIVE DATA |
| 29 | CTS | O | SERIAL PORT CLEAR TO SEND |
| 30 | DSR | I | SERIAL PORT DATA SET READY |
| 31 | DCD | I | SERIAL PORT DATA CARRIER DETECT |
| 32 | RI | I | SERIAL PORT RING INDICATOR |
| 33 | GND | - | GROUND |
| 34 | GND | - | GROUND |

*Fig. 4a*

| PIN | SIGNAL | DIRECTION | DEFINITION |
|-----|--------|-----------|------------|
| 35 | GND | - | GROUND |
| 36 | FAST/TRIC | O | FAST CHARGE CONTROL TO AC CUBE |
| 37 | VEXTCHR | I | BATTERY CHARGING INPUT FROM AC CUBE |
| 38 | VEXTCHR | I | BATTERY CHARGING INPUT FROM AC CUBE |
| 39 | VEXTCHR | I | BATTERY CHARGING INPUT FROM AC CUBE |
| 40 | VEXTCHR | I | BATTERY CHARGING INPUT FROM AC CUBE |
| 41 | VEXT | I | POWER INPUT FROM AC CUBE |
| 42 | VEXT | I | POWER INPUT FROM AC CUBE |
| 43 | VEXT | I | POWER INPUT FROM AC CUBE |
| 44 | GND | - | GROUND |
| 45 | GND | - | GROUND |
| 46 | RESETDRV | O | SYSTEM RESET |
| 47 | IRQ10 | I | INTERRUPT REQUEST 10 |
| 48 | -IOW | O | I/O WRITE COMMAND |
| 49 | -IOR | O | I/O READ COMMAND |
| 50 | IOCHRDY | I | I/O CHANNEL READY (WAIT STATE GENERATOR) |
| 51 | -ZPORTCS | O | SPORT CHIP SELECT (PROGRAMMABLE) |
| 52 | GND | - | GROUND |
| 53 | GND | - | GROUND |
| 54 | SD7 | B | SYSTEM DATA BIT 7 |
| 55 | SD6 | B | SYSTEM DATA BIT 6 |
| 56 | SD5 | B | SYSTEM DATA BIT 5 |
| 57 | SD4 | B | SYSTEM DATA BIT 4 |
| 58 | SD3 | B | SYSTEM DATA BIT 3 |
| 59 | SD2 | B | SYSTEM DATA BIT 2 |
| 60 | SD2 | B | SYSTEM DATA BIT 1 |
| 61 | SD2 | B | SYSTEM DATA BIT 0 |
| 62 | SA3 | O | SYSTEM ADDRESS BIT 3 |
| 63 | SA2 | O | SYSTEM ADDRESS BIT 2 |
| 64 | SA1 | O | SYSTEM ADDRESS BIT 1 |
| 65 | SA0 | O | SYSTEM ADDRESS BIT 0 |
| 66 | GND | - | GROUND |
| 67 | GND | - | GROUND |
| 68 | KBCLK | B | MOUSE CLOCK |

COMPUTER FOR USE WITH A PORT REPLICATOR

CROSS REFERENCE TO RELATED APPLICATIONS

This application is a division of Ser. No. 08/104,950, filed Aug. 10, 1993, now U.S. Pat. No. 5,460,547, which is a continuation of Ser. No. 07/862,859, filed Apr. 3, 1992, now abandoned. This application relates to U.S. Pat. No. 5,123,092, Buxton et al., External Expansion Bus Interface, assigned to a common assignee with the present application. The disclosure of U.S. Pat. No. 5,123,092 is incorporated herein by reference.

FIELD OF THE INVENTION

The invention relates to portable computers, and more specifically to means for connecting peripheral devices to portable computers.

BACKGROUND OF THE INVENTION

Portable computers have revolutionized the way in which one works by allowing far greater flexibility in where one works. The ever decreasing size of computers has resulted in ever increasing flexibility. Notebook and sub-notebook computers now allow one to take a computer with them virtually anywhere. Advanced battery management techniques allow portable computers to be used for extended periods of time without external power.

Connectivity products have been no less revolutionary. One can improve flexibility and efficiency by connecting his computer to printers, plotters, modems, trackballs, mice, local area networks, optical disk drives, image scanners, and many other peripheral devices.

However, connectivity and mobility are rarely compatible. The need to disconnect and reconnect many external devices significantly reduces ones ability to grab these tiny computers and to run with them.

There have been several attempts to create a system where multiple devices can be connected and disconnected in a single action. One such system is described in U.S. Pat. No. 5,123,092 to Buxton et al. The Buxton et al. patent describes an expansion box that provides for peripheral connections. The expansion box also provides space for industry standard desktop PC circuit boards that will not fit into a small portable computer. The expansion box disclosed in the Buxton et al. patent can be quickly connected to and disconnected from a portable computer with a single connector.

However, such an expansion box is quite complex and expensive. It has its own power supply and circuitry to handle contention between devices in the computer and devices residing at the same bus address in the expansion box.

Every device in a computer has an address. If you provide a serial port on a computer and a second serial port having the same address in a connected expansion box, special circuitry is need to prevent conflicts between these two ports. The expansion box disclosed in the Buxton et al. patent provides such circuitry.

Another approach to the problem is disclosed in U.S. Pat. No. 5,030,128 to Herron et al. The Herron et al. patent discloses a docking module that provides connectors aligned with corresponding connectors on the back of a portable computer. The connectors can be connected and disconnected simultaneously by connecting and disconnecting the docking module. The docking module also provides duplicate connectors for the connection of peripheral devices. These duplicate connectors are wired straight through to the connectors connected to the computer. The docking module disclosed in the Herron et al. patent is a passive device, and it is therefore less expensive than the expansion box disclosed in the Buxton et al. patent.

However, it is not a single connector like the expansion box disclosed in the Buxton et al. patent. In the docking module, each connector is reproduced between the docking module and the computer causing a significant amount of resistance to making a connection. The docking module further requires precise alignment of multiple connectors on the docking module and computer. A lever arrangement is provided to exert enough effort to connect the docking module to the computer. If the alignment is not exact, the connection force can cause damage to the connectors.

OBJECTS OF THE INVENTION

An the object of this invention is provide a means for coupling multiple peripheral devices to a portable computer in a single action.

Another object of this invention is to provide an inexpensive means of accomplishing this task.

Yet another object of the innovation is to provide a connection means that can be engaged and disengaged with minimal effort.

SUMMARY OF THE INVENTION

A port replicator is disclosed that provides for the efficient connecting and disconnecting of peripheral devices to a computer. A replicator port connector is provided on a portable computer that duplicates the pins of other peripheral connectors on the computers. The housing of the port replicator is attached by spring clips to the computer which covers the other peripheral connectors replicated by the port replicator. The replicated connectors are then reproduced on the connector housing. Cables for peripheral devices can remain connected to the connector housing but be connected to and disconnected from the computer in a single action.

BRIEF DESCRIPTION OF THE DRAWINGS

The preferred embodiment demonstrating the various objectives and features of the invention will now be described in conjunction with the following drawings:

FIG. 4 is a table showing the pinout of the replicator port connector with descriptions of the included signals.

DETAILED DESCRIPTION OF THE PREFERRED EMBODIMENTS OF THE INVENTION

Figure 1:
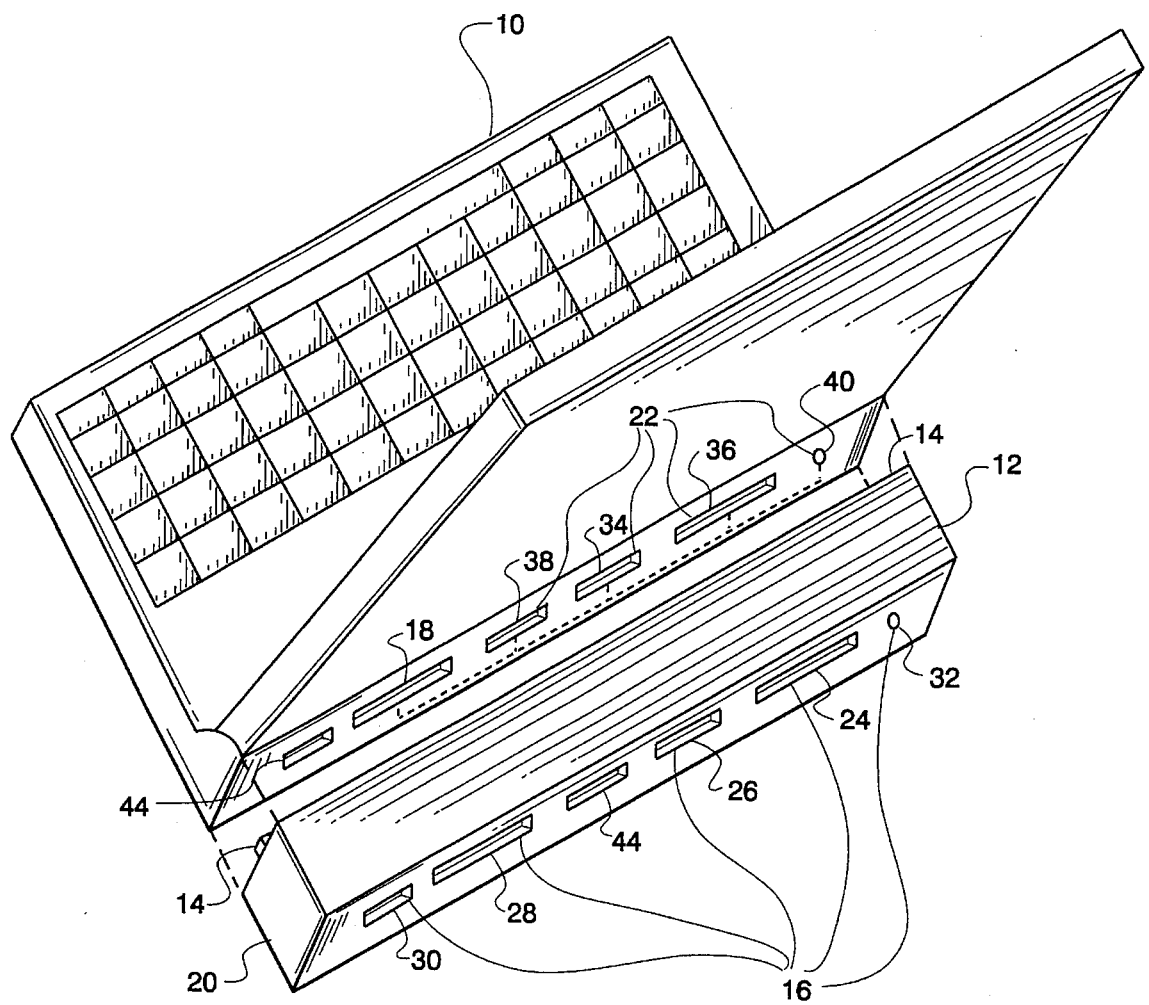
FIG. 1 is an exploded diagrammatic view of a computer connected to a port replicator.
Figure 2:
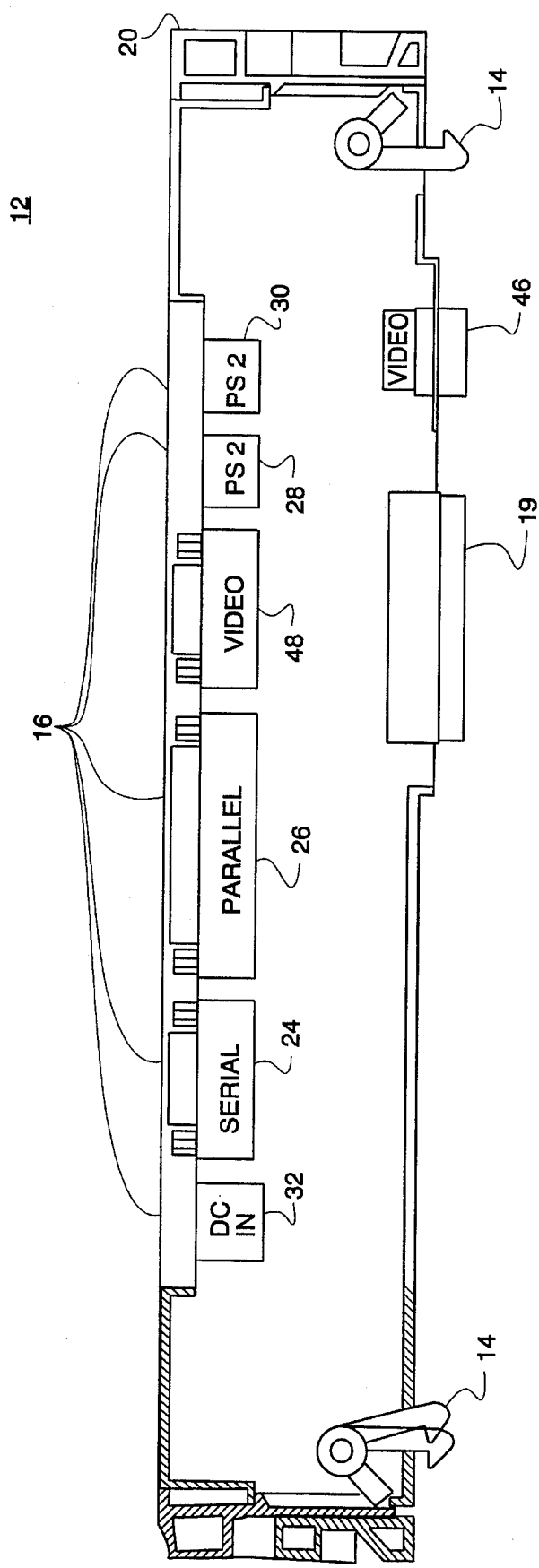
FIG. 2 is an overhead view of the preferred port replicator.

Referring to FIG. 1, a computer 10 is coupled to a port replicator 12 and is secured by conventional spring latches 14. The port replicator 12 is shown in more detail in FIG. 2. External peripheral devices (not shown) can be coupled by means of replicated ports 16 to the port replicator 12. A replicator port 18 on the computer 10 connects to a computer port 19 on the port replicator 12. A connector housing 20 of the port replicator 12 covers computer ports 22 and prevents any connection to the computer ports 22 while the port replicator 12 is connected to the computer 10.

In the preferred embodiment of the invention, the connector housing 20 is a simple rectangular box to minimize manufacturing cost. Other configurations could provide for the covering of ports on other sides of the computer 10 by altering the shape of the connector housing 20 such as an L or an U shape. This simple mechanical system prevents duplicate connectors from being connected to the same port by covering up the duplicate port and replaces far more expensive electrical circuitry that was used in the past to accomplish the same task.

The computer ports 22 need not be exactly the same as the replicated ports 16. The port replicator 12 may include ports not provided on the computer 10 and ports may be provided on the computer 10 that are not replicated on the port replicator 12. However, if a given port is provided on the computer 10 and also on the port replicator 12, the computer connector needs to be located such that it is covered up by the connector housing 20 while the port replicator 12 is attached to the computer 10.

The replicated ports 16 include an RS232 serial port 24, a Centronix type parallel port 26, a mouse port 28, an external keyboard port 30, and a DC power connector 32. The computer ports 22 include an RS232 serial port 34, a Centronix type parallel port 36, a mouse port 38, and a DC power connector 40.

A computer video port 44 on the computer 10 is connected to a video input port 46 on the port replicator 12 and directly through to a video output port 48. In the preferred embodiment, video port 46 is not connected through computer port 19 because the radio frequency ("RF") signal created by video port 46 is disruptive to other signals on computer port 19. It should be understood, however, that the invention is not limited to the configuration shown in the preferred embodiment. Different shielding and grounding arrangements can enable the inclusion of video port 46 signal lines on computer port 19. Other common computer connectors could also be included in computer port 19 such as a local area network adapter or telephone line.

The reduced mechanical resistance of the connection between the replicator port 18 and the computer port 19 as compared with the resistance of the numerous-separate replicated ports 16 allows the port replicator 12 to be connected to and disconnected from the computer 10 in a single gentle action by simply pressing the two together. No levers or mechanical advantage is needed to connect the port replicator 12 to the computer 10. Latches 14 are spring biased to engage the computer 10 when the port replicator 12 is fully connected to the computer 10.

Figures 3, 3G:
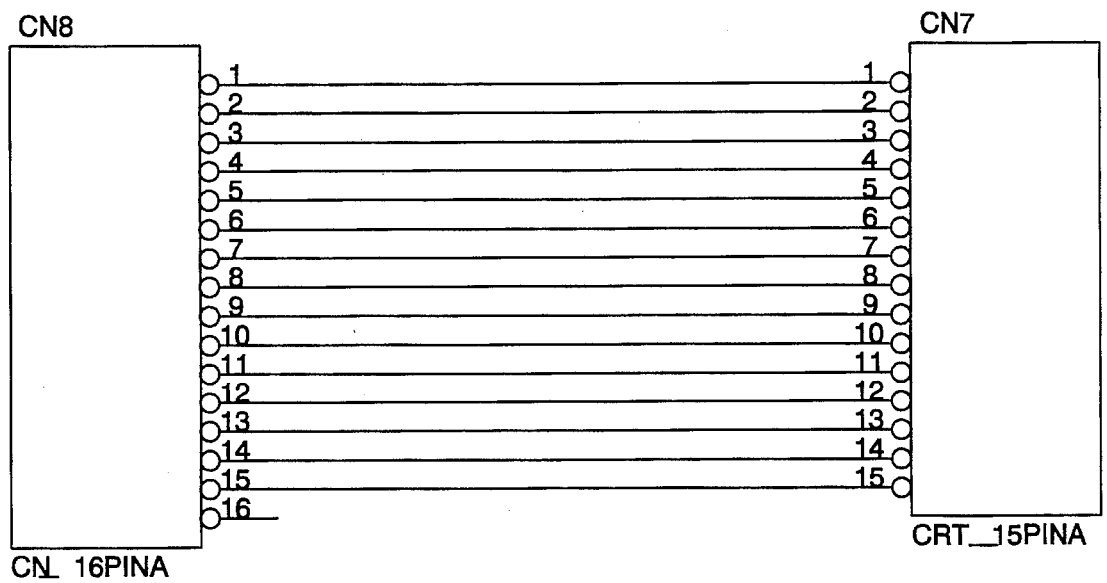
FIG. 3 is an electrical schematic of the preferred port replicator.
Figure 3A:
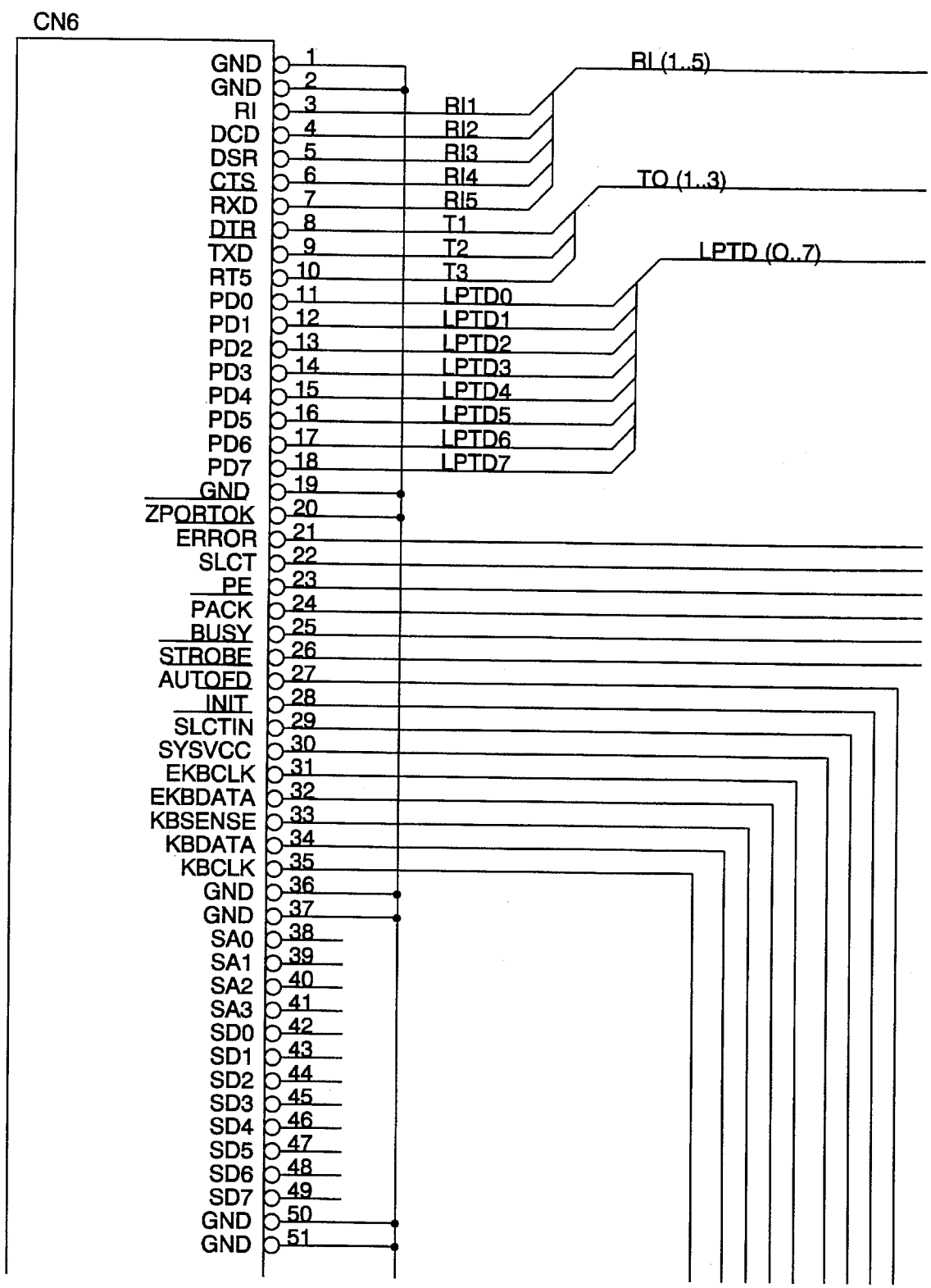
Figure 3B:
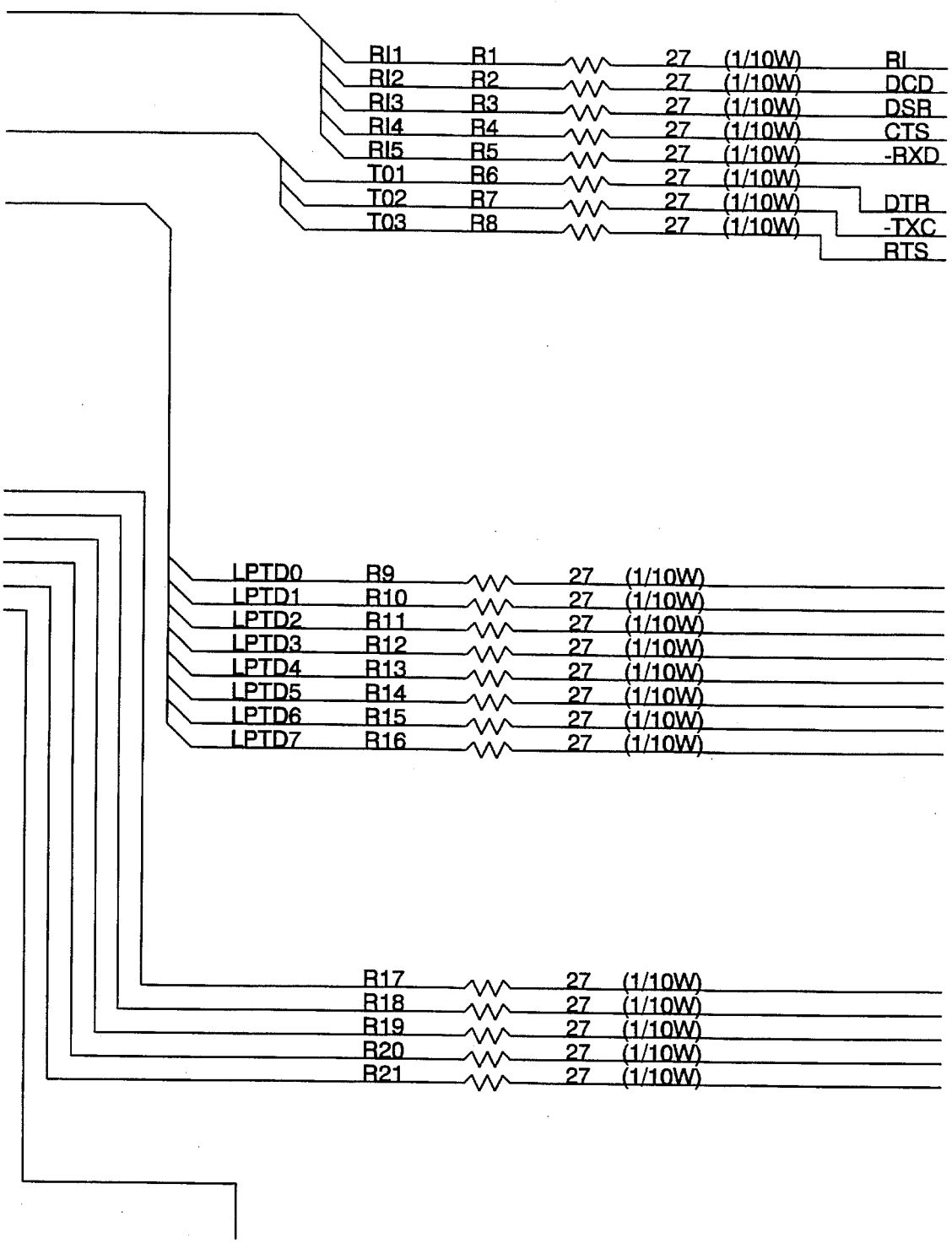
Figure 3C:
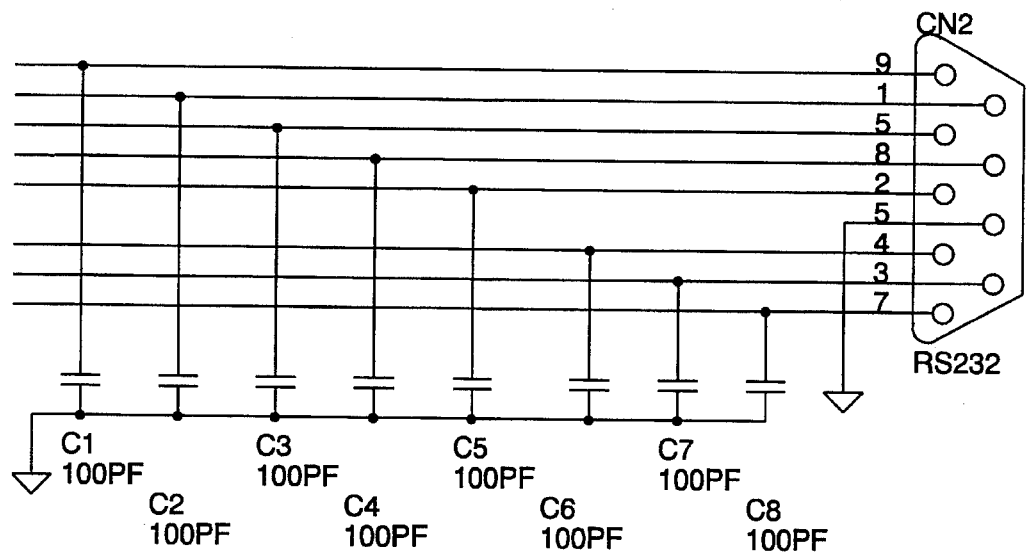
Figure 3C:
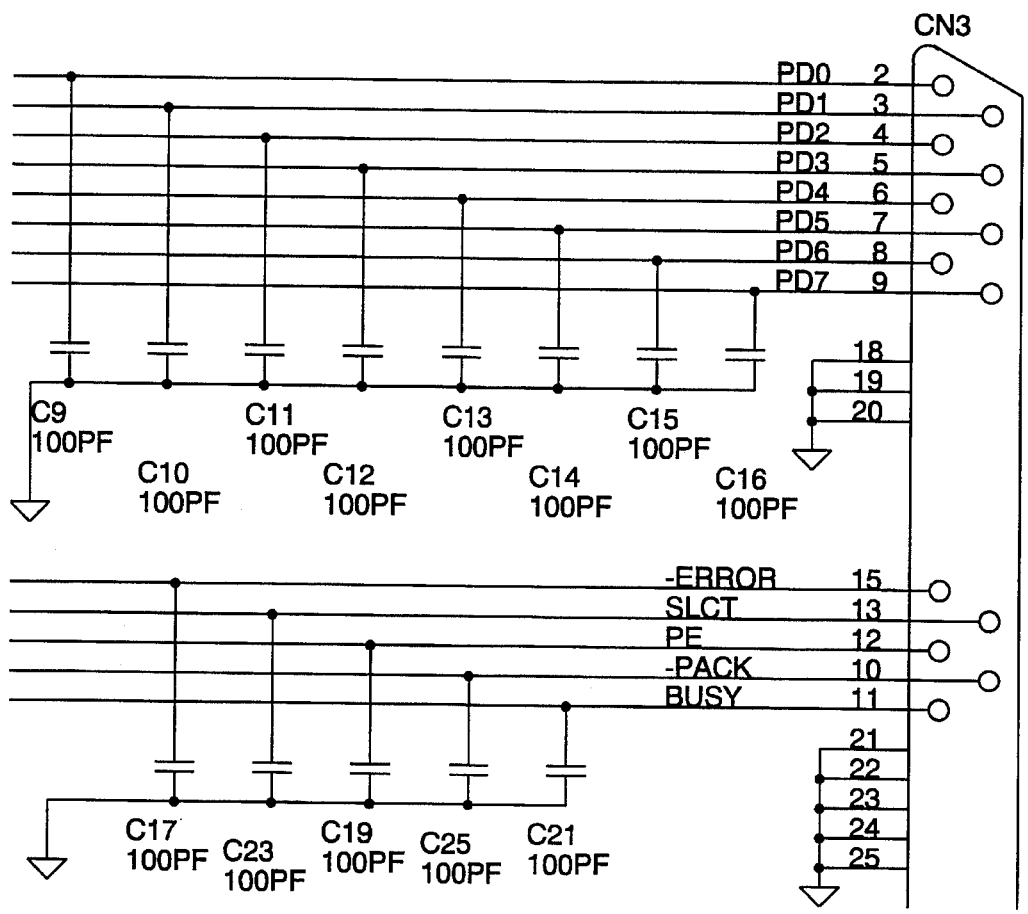
Figure 3D:
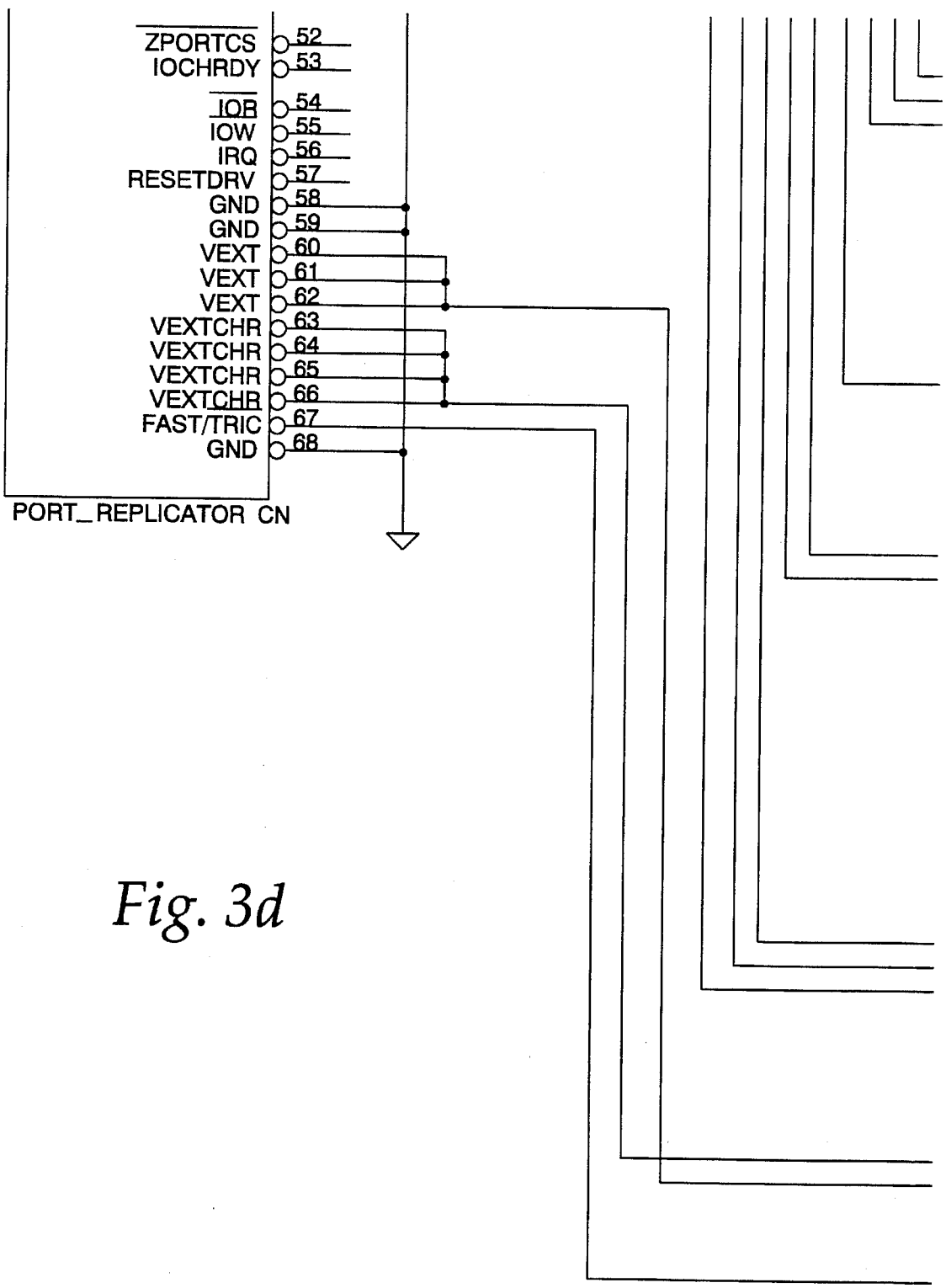
Figure 3E:
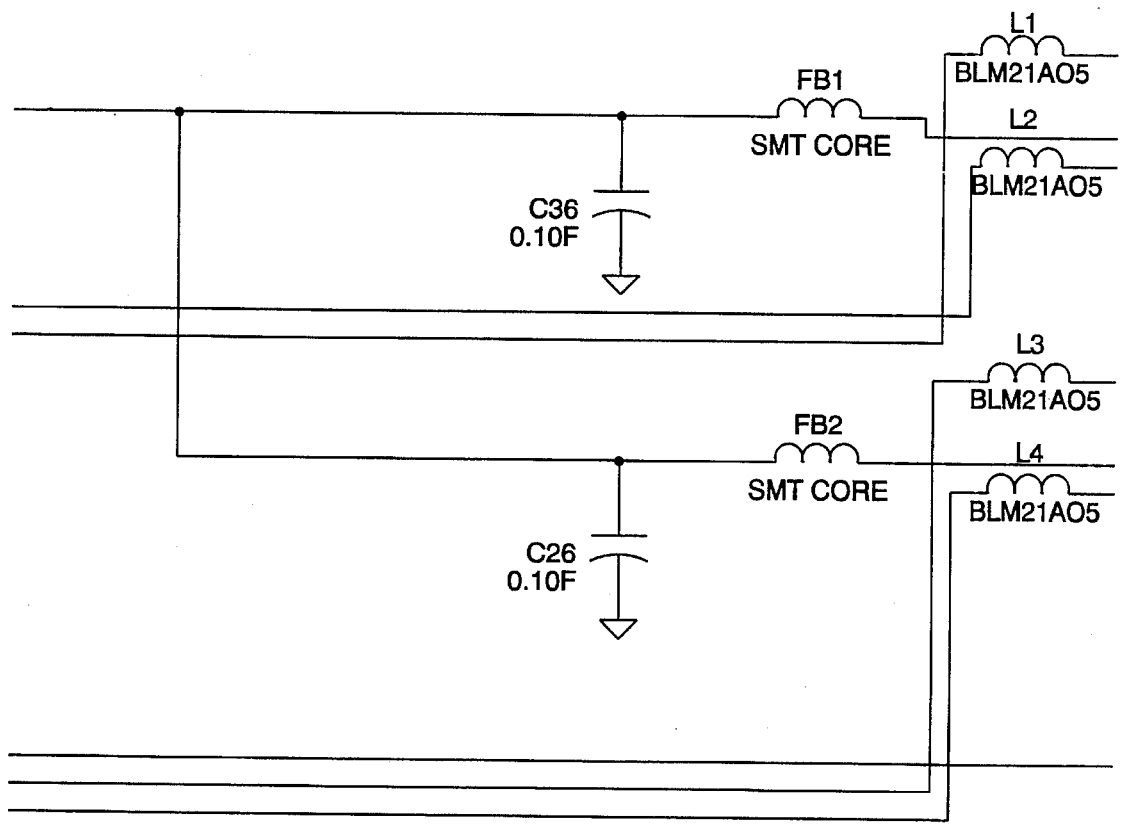
Figure 3F:
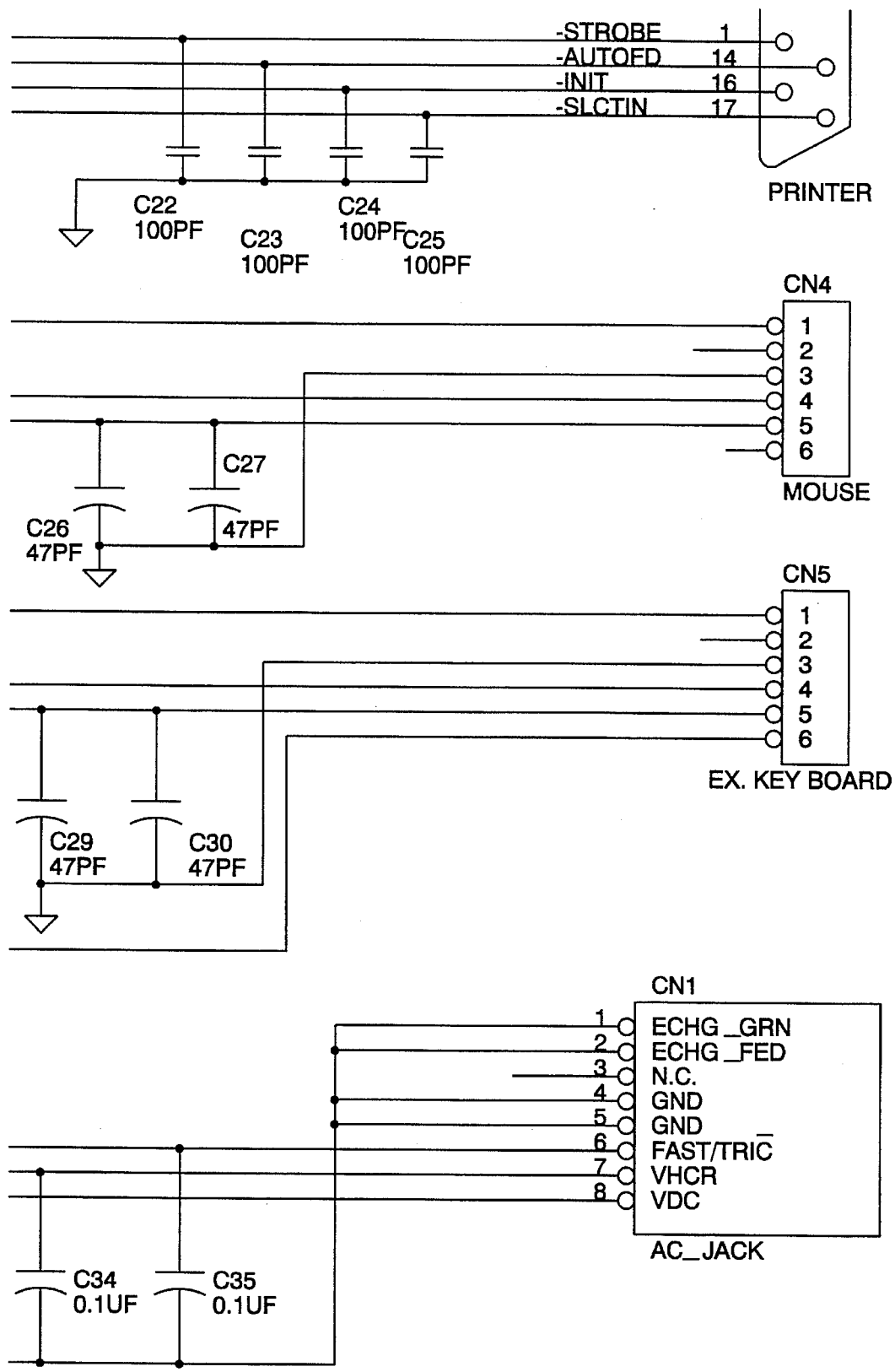

Referring to FIG. 3, computer port 19 is connected directly to replicated ports 16. The port replicator 12 is an entirely passive device. It has no power supply and draws no power, other than the signals themselves, from the computer 10. Capacitors 50 to ground 52 and inductors 54 provide RF isolation. The serial port 24 and the parallel port 26 have only capacitive isolation while the mouse port 28, and the external keyboard port 30 and the DC power connector 32 have both capacitive and inductive isolation. This is simply because the mouse port 28, the external keyboard port 30, and the DC power connector 32 will function properly with the additional reactance of an inductor while the serial port 24 and the parallel port 26 can not. The inductors further reduce RF radiation as compared with capacitors alone.

A series of bus data, address, and control signals 56 are provided within in the replicator port 18 and the computer port 19 to provide for attachment to an active device such as the expansion box disclosed in application Ser. No. 260,964, External Expansion Bus Interface to Clark Buxton et al (cited above). By including both types of signals in the replicator port 18 the same replicator port 18 can be used to connect the computer 10 to a passive port replicator or to an active expansion box (not shown), thus reducing the number of connectors that are required on computer 10.

Although described above in terms of the preferred embodiment, the present invention is set forth with particularity in the appended claims. Such modifications and alterations as would be apparent to one of ordinary skill in the art and familiar with the teachings of this application shall be deemed to fall within the spirit and scope of the invention.

We claim:

1. A computer comprising:

a computer housing;

a plurality of peripheral ports of various different types;

a plurality of electrical connectors carried by the computer housing and electrically coupled to said plurality of peripheral ports; and a first common electrical connector carried by the computer housing and electrically coupled to said plurality of electrical connectors, the first common electrical connector adapted to be removably attached and electrically coupled to a second common electrical connector external to said computer housing.

2. The computer of claim 1, wherein said electrical connectors are carried by said computer housing in a single plane and adapted to be covered by an external housing.

3. The computer of claim 1, further comprising latch means for latching an external housing to said computer housing.

4. A system for connecting multiple peripheral devices to a computer having a housing, the system comprising:

a plurality of first individual electrical connectors carried by the computer housing and adapted to receive mating electrical connectors to enable external peripheral devices to be electrically coupled to said computer;

a plurality of peripheral ports of various different types, each peripheral port being electrically coupled to at least one of said plurality of first individual electrical connectors;

a first common electrical connector, carried by the computer housing, and electrically coupled to each of said first individual electrical connectors;

a port replicator having a housing;

a plurality of second individual electrical connectors, carried by the port replicator housing; and a second common electrical connector carried by the port replicator housing, adapted to releasably mate with said first common electrical connector, and coupled to said plurality of second individual electrical connectors.

5. The system for connecting multiple peripheral devices to a computer as recited in claim 4, wherein said plurality of peripheral ports of various different types include a keyboard port, a mouse port and a video port.

6. The system for connecting multiple peripheral devices to a computer as recited in claim 4, further including means for preventing connection of said mating connectors for said peripheral devices, to said plurality of first individual electrical connectors when said second common electrical connector is mated with said first common electrical connector.

7. The system for connecting multiple peripheral devices to a computer as recited in claim 6, wherein said preventing means includes means for physically blocking said first individual electrical connectors when said second common electrical connector is mated with said first common electrical connector.

8. The system for connecting multiple peripheral devices to a computer as recited in claim 4, further including means for securing the port replicator housing to said computer housing.

9. The system for connecting multiple peripheral devices to a computer as recited in claim 4, wherein said securing means includes attachable and detachable clips mounted on said port replicator housing, adapted to engage said computer housing.

10. The system for connecting multiple peripheral devices to a computer as recited in claim 4, further including bus signal lines included within said first common electrical connector and said second common electrical connector.

11. A computer system comprising:

a computer having a housing;

a port replicator housing removably attachable to a said housing;

a plurality of first individual electrical connectors of various different types, carried by the computer housing;

a plurality of second individual electrical connectors of various different types, carried by the port replicator housing;

a first common electrical connector carried by the computer housing, electrically coupled said first plurality of individual electrical connectors; and a second common electrical connector carried by the port replicator housing, electrically coupled said second plurality of individual electrical connectors and adapted to releasably mate with said first common electrical connector.

12. A computer system having a plurality of peripheral ports, each peripheral port electrically coupled to an individual electrical connector for connection to an external peripheral ports and to a first common electrical connector said computer adapted to be coupled to a predetermined port replicator, the computer comprising:

a housing removably attachable to the computer;

a plurality of peripheral ports of various different types, carried by the housing each peripheral port coupled to an individual electrical connector for connection to an external peripheral device; and a computer port carried by the housing, said computer port electrically coupled to a second common electrical connector coupled to each of said individual electrical connectors and adapted to releasably mate with the first common electrical connector carried by the computer to enable external peripheral devices coupled to the individual electrical connectors to communicate with the computer.

13. A computer system adapted to simplify the connection of multiple peripheral devices to the computer system comprising:

a computer housing;

a plurality of peripheral ports of various different types;

a first common electrical connector carried by the computer housing, electrically coupled to each of said individual electrical connectors;

a port replicator having a housing, removably attachable to the computer;

a plurality of peripheral ports of various different types, each peripheral port electrically coupled to an individual electrical connector carried by the port replicator housing; and a computer port carried by the port replicator housing, electrically coupled to a second common electrical connector and electrically coupled to each of said individual electrical connectors, said second common electrical connector carried by the port replicator housing and adapted to releasably mate with said first common electrical connector.

14. The computer system as recited in claim 13, wherein said various different types of peripheral ports include a keyboard port, a mouse port, and a video port.

15. A computer comprising:

a computer housing;

a plurality of electrical connectors of various types carried by said computer housing, each one of said electrical connectors being individually addressable by the computer as unique ports of the computer; and means for electrically coupling a predetermined one of said electrical connectors to the others of said plurality of electrical connectors to electrically interconnect each of the various types of electrical connectors carried by said computer housing at said predetermined one of said electrical connectors facilitating replication of other of said plurality of electrical connectors from said predetermined one of said electrical connectors.

16. A computer as recited in claim 15, wherein said computer comprises a bus for communication with said ports and wherein said means for electrically coupling comprises coupling said bus to said predetermined one of said electrical connectors facilitating replication of other of said plurality of electrical connectors from said bus.

17. A kit for simplifying the connection a computer to multiple peripheral devices comprising:

a computer housing for the computer;

a plurality of electrical connectors of various types carried by said computer housing, each one of said electrical connectors being individually addressable by the computer as unique ports of the computer;

means for electrically coupling a predetermined one of said electrical connectors to the others of said plurality of electrical connectors to electrically interconnect each of the various types of electrical connectors carried by said computer housing at said predetermined one of said electrical connectors facilitating replication of other of said plurality of electrical connectors from said predetermined one of said electrical connectors;

a port replicator housing removably attachable to the computer housing for connecting multiple peripheral devices to the computer;

a plurality of peripheral ports of various different types, carried by the port replicator housing each peripheral port coupled to an individual electrical connector for connection to an external peripheral device; and a computer port carried by the port replicator housing, said computer port electrically coupled to a common electrical connector coupled to each of said individual electrical connectors and adapted to releasably mate with said predetermined one of said electrical connectors carried by said computer housing to enable external peripheral devices coupled to the individual electrical connectors to communicate with the computer.

18. The computer system recited in claim 17, wherein said plurality of peripheral ports are coupled to individual electrical connectors carried by said computer housing.

* * * * *